US006969932B2

(12) United States Patent
Kim et al.

(10) Patent No.: US 6,969,932 B2
(45) Date of Patent: Nov. 29, 2005

(54) APPLICATION OF CORROSION PROTECTIVE COATING FOR EXTENDING THE LIFETIME OF WATER COOLED STATOR BAR CLIPS

(75) Inventors: Young Jin Kim, Clifton Park, NY (US); Paul Joseph Martiniano, Schenectady, NY (US); Reed Roeder Corderman, Niskayuna, NY (US); Scott Andrew Weaver, Ballston Lake, NY (US); Alan Michael Iversen, Clifton Park, NY (US); James Rollins Maughan, Schenectady, NY (US)

(73) Assignee: General Electric Co., Schenectady, NY (US)

( * ) Notice: Subject to any disclaimer, the term of this patent is extended or adjusted under 35 U.S.C. 154(b) by 84 days.

(21) Appl. No.: 10/622,142

(22) Filed: Jul. 18, 2003

(65) Prior Publication Data

US 2005/0012408 A1 Jan. 20, 2005

(51) Int. Cl.[7] .......................... H02K 9/19; H02K 15/00
(52) U.S. Cl. ............................. 310/59; 310/58; 29/596
(58) Field of Search ........................ 310/54, 57–59, 310/60 A; 29/596

(56) References Cited

U.S. PATENT DOCUMENTS

| | | | |
|---|---|---|---|
| 3,681,634 A | * | 8/1972 | Peter .......................... 310/218 |
| 3,922,396 A | * | 11/1975 | Speirs et al. ................. 148/529 |
| 5,325,725 A | | 7/1994 | Sanderson et al. ........ 73/861.21 |
| 5,557,837 A | | 9/1996 | Thiard-Laforet et al. ..... 29/596 |
| 5,581,869 A | | 12/1996 | Travaly ........................ 29/596 |
| 5,796,189 A | | 8/1998 | Manning et al. .............. 310/54 |
| 6,102,105 A | | 8/2000 | Moran et al. ................. 165/76 |
| 6,367,311 B1 | | 4/2002 | Garg ....................... 73/40.5 R |
| 6,447,020 B1 | * | 9/2002 | Kacines et al. ............. 285/256 |
| 6,527,165 B1 | * | 3/2003 | Budinger et al. ........... 228/226 |
| 6,852,428 B2 | * | 2/2005 | Hirota et al. ............... 428/680 |

* cited by examiner

Primary Examiner—Darren Schuberg
Assistant Examiner—Judson H. Jones
(74) Attorney, Agent, or Firm—Nixon & Vanderhye P.C.

(57) ABSTRACT

A water-cooled stator bar clip for electrical generators and a method for applying a corrosion-resistant protective coating, preferably Sc, Ti, Cr, Zr, Nb, Mo, Hf, Ta, W, Ni, and Al, and their alloys or oxides to existing stator bar end fittings in order to significantly reduce the possibility of leaks through the brazed connections of the copper stator bar end connections. The coatings can be applied locally using various known physical vapor deposition ("PVD"), chemical vapor deposition ("CVD") or other direct coating techniques known in the art. For example, the coatings can be applied using ion plasma deposition, sputtering or wire arc techniques (all PVD processes) or by using electroplating, high velocity oxygen free ("HVOF") deposition, DC arc or electroless plating. Preferably, the coatings are applied either to new stator bar clips or to existing clips in the field using a known pencil coater technique. After being deposited, the metallic coatings form a protective oxide layers over the existing copper brazed joint after being exposed to a water environment, thereby protecting the chemical and structural integrity of the underlying copper brazed joint.

20 Claims, 7 Drawing Sheets

APPLICATION OF CORROSION PROTECTIVE COATING FOR EXTENDING THE LIFETIME OF WATER COOLED STATOR BAR CLIPS

BACKGROUND OF THE INVENTION

The present invention relates to a new type of end fittings for water-cooled stator bars used in electrical generators (typically known as "stator bar clips") in which a corrosion protective coating is applied to the interior brazed joints of the end fittings. The invention also relates to a new method for applying prescribed amounts of the protective coating to the stator bar end fittings of both new and in-service generators. The product and method according to the invention improve the lifetime of stator bar clips and significantly reduce the possibility of leaks over time through the stator bar fluid channels and connections.

The stator windings in electrical generators typically consist of a plurality of insulated copper bars assembled in slots and brazed into copper clips on the ends to form bar assemblies. Each stator bar includes a combination of small rectangular solid and hollow copper conductors known as "strands," that are brazed to one another within the stator bar and brazed to the interior walls of an end fitting. The hollow strands provide the means for circulating coolant, typically de-ionized water, through the strands to prevent the generator from overheating by removing heat from the insulated stator bars. An end fitting typically includes an enclosed chamber for ingress or egress of the stator bar cooling liquid. That is, the fitting provides a hollow chamber that serves to manifold the water passages of the strands. Another opening of the end fitting receives the ends of the strands of the stator bar, typically with the outermost copper strands of the stator bar brazed to one another.

During normal operation of the generator, leaks can develop over time at or near the connection between the ends of the stator bars and the end fitting, as well as between adjacent copper strands. The end fitting/copper strand connection, as well as the strand-to-strand joints have the highest potential for causing damage to the generator if a leak occurs because a leak at those locations could flow directly into the ground wall insulation of the generator winding. The likely result of such a leak would be a degradation of the dielectric strength of the insulation and possible failure at or near the winding. Based on past experience, such leaks generally result from a corrosion process that begins on the interior surface of the brazed joint of the water-cooled stator bar clips. The leak mechanism is believed to result from a two-part corrosion process initiated at the surface of the brazed joint where stagnant water tends to reside in small cavities created during the brazing of concave joint surfaces between adjacent strands.

In the past, copper and its allows have been used for stator bars because of their generally good corrosion resistance, moderate costs and advantageous dielectric properties and thermal conductivities. Copper is considered a noble metal and will react in environments with oxygen present. Thus, copper is vulnerable to eventual corrosion and failure over time. Localized corrosion of water-cooled stator bars normally occurs in areas where the oxygen-free high conductivity ("OFHC") copper contacts the brazing alloy. More severe corrosion can also occur in creviced regions between the OFHC copper and the brazing alloy, or in small voids formed during the brazing process. The crevices tend to limit the flow of cooling liquid into and around localized areas of the metal surface.

The occurrence of crevice corrosion thus depends to some degree on the specific crevice geometry and the alloy combination involved. Localized environmental changes in a "stagnant" area can also result in the formation of acidic conditions (typically phosphoric acid) that result in the initiation and propagation of unwanted crevice corrosion.

The field repair of leaks occurring through stator bar end connections has only been moderately successful in the past. Frequently, the inability to repair leakage through the stator bar end connections forces generator owners to replace the leaking bars or the entire stator winding in order to eliminate the leaks. Such in-kind replacements with entirely new components can be expensive and require significant generator downtime.

Many concerns over stator bar leaks relate to the brazing process itself and hence the hydraulic integrity of the resulting brazed joint. Past experience with the brazing process shows that completely sound repair brazes are difficult to achieve because of the relatively large surface area involved, as well as the inability to effectively feed a braze alloy into the joint during solidification. Consequently, some unwanted porosity can occur in the brazed joints themselves or at the joint surface, resulting in rework or scrapping of the stator bars. Worse, the repairs can create conditions that actually enhance subsequent corrosion and/ or erosion after the generator is placed back into service.

One known method of repairing stator bars is described in commonly-owned U.S. Pat. No. 5,581,869, entitled "Repair Method for Sealing Liquid-Cooled Stator Bar End Fittings For a generator." The '869 patent describes and claims a repair technique that involves the on-site removal of a majority of the original end fitting such that only a continuous ring surrounding the strand bundle remains. The exterior portion of the ring is machined to an acceptable tolerance for brazing with a replacement end fitting. The repair alloy used in the repair process, like the original alloy, typically consists of a copper phosphorous alloy but with a higher concentration of silver or other element to ensure that the repair alloy will have a lower melting point temperature than the original alloy. The machined ring that surrounds the exterior periphery of the strands is then inserted into a replacement end fitting and brazed without disturbing the prior braze.

Another known repair method coats the surfaces of strands in the stator bar clips with epoxy to protect them from erosion. Other known methods for repairing leaking stator bars involve varying degrees of generator disassembly to fix individual stator bar clips, in some cases requiring complete removal and replacement of the stator bars. Again, considerable generator downtime is necessary to gain access to the stator bars, making such repairs costly and time consuming.

Typical of other known prior art repair methods is U.S. Pat. No. 5,557,837 to Thiard-Laforet et al which discloses a method for repairing stator winding bars whereby narrow slots are introduced between adjacent conductor elements into the end of the bar in the transverse and vertical directions. A first connecting part surrounding the bar is pushed on, and the outer surfaces of the bar end are filled with copper foil and/or solder foil and then inductively heated and soldered. Again, such repair methods are costly and time-consuming and do not always solve an inherent corrosion problem, namely the increased likelihood of localized corrosion at or near stagnant water zones.

BRIEF DESCRIPTION OF THE INVENTION

The present invention provides a new type of water-cooled stator bar clip having a corrosion protective coating that significantly extends the projected lifetime of the clips and thus substantially improves the reliability and efficiency of the generator over time. In particular, the present invention provides an improved end clip design and method for uniformly coating the stator bar (particularly the more vulnerable crevice regions) with an oxidation-resistant protective coating either prior to or after placing the generator in service. Thus, the product and repair method according to the invention can be used on both new and used generator equipment.

Preferably, the protective coating according to the invention includes the group of metals consisting of the following metals: Sc, Ti, Cr, Zr, Nb, Mo, Hf, Ta, W, Ni, and Al, and their alloys or oxides. The coatings can be applied locally using known physical vapor deposition ("PVD"), chemical vapor deposition ("CVD") or other direct coating techniques known in the art. For example, the coatings can be applied using ion plasma deposition, sputtering or wire arc techniques (all PVD processes) or by using electroplating, high velocity oxygen free ("HVOF") deposition, DC arc or electroless plating. The coatings can be applied to new stator bar clips (before an initial installation) or to existing clips in the field using various coating techniques, including a new pencil coater technique described below which can be used to effectively coat the internal area of the clip by inserting it down the neck of the clip. Preferably, the coatings as applied in accordance with the invention have a thickness ranging between 0.5 and 50 microns.

Significantly, after the protective metallic coatings are deposited on the end fittings, they immediately begin to form protective oxide layers over the existing copper brazed joint after being exposed to a water environment. In that manner, the coatings serve to protect both the chemical and structural integrity of the underlying copper brazed joint.

DETAILED DESCRIPTION OF THE INVENTION

Figure 1:
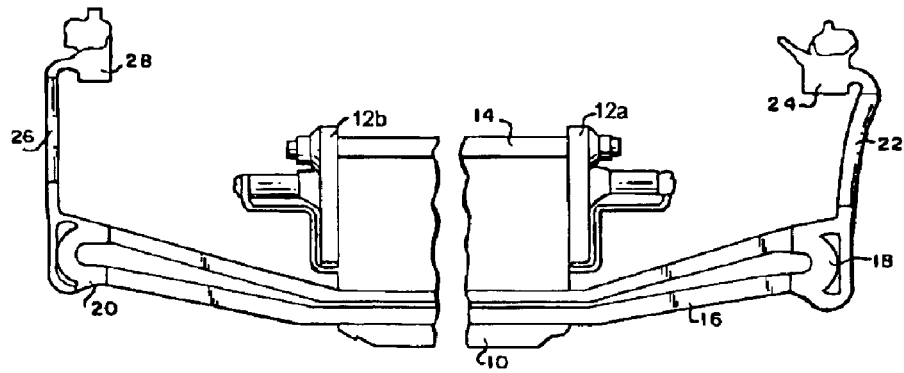
FIG. 1 is a schematic drawing of a conventional liquid-cooled stator winding arrangement showing the stator bars and end fittings coupled to inlet and outlet cooling headers.

Referring now to the drawings, FIG. 1 illustrates a liquid-cooled stator winding arrangement used in a typical liquid-cooled generator. A stator core 10 having stator core flanges 12a and 12b and core ribs 14 are shown, with stator bars 16 passing radially through extending slots in the stator core 10 and terminating at opposite ends in inlet and outlet end fittings 18 and 20, respectively. A plurality of inlet coolant hoses 22 connect inlet end fitting 18 to an inlet coolant header 24. In like manner, outlet coolant hoses 26 connect outlet end fitting 20 to an outlet coolant header 28. End fittings 18 and 20 consist of an electrically conductive material such as copper.

Figure 2:
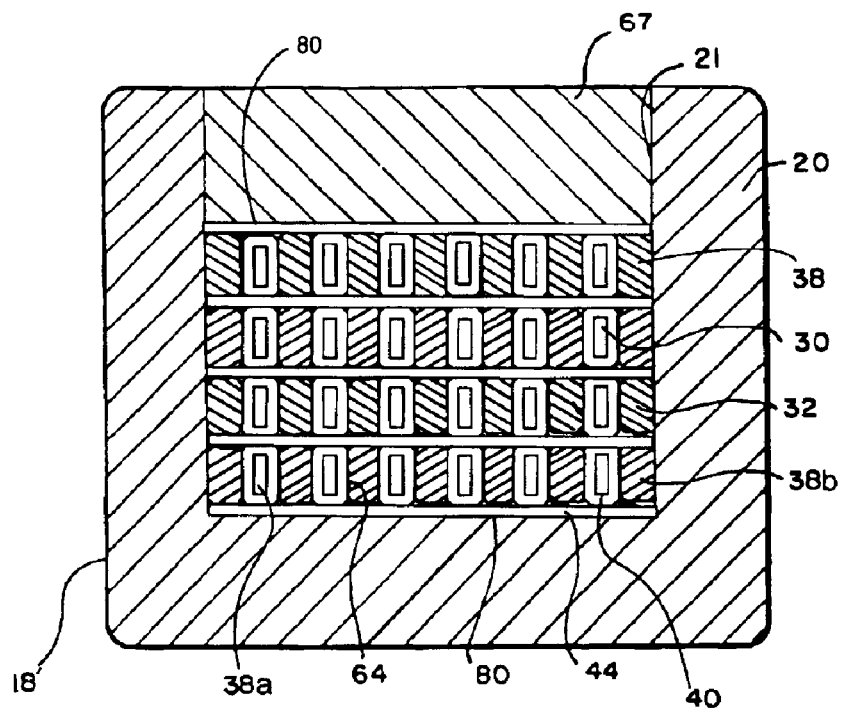
FIG. 2 is an end cross-sectional view of the strands of an exemplary stator bar within an end fitting and depicts the general locations of the protective coating to be applied in accordance with the invention.

As illustrated in FIG. 2, each water-cooled stator bar includes a plurality of both hollow and solid copper strands 30 and 32, respectively, disposed in side-by-side and superimposed relationship. The strands within the stator bar are brazed at joints 64, as well as brazed to the interior walls of the end fitting 20 along joints 80. The brazing material typically comprises a copper phosphorous alloy. As explained above, leakage often results from stagnant cooling liquid in the fitting which contacts the brazing material and initiates the corrosion process. The greatest potential leak sites include the areas around brazed joints 64 between strands 30, 32 and the brazed joints 80 between the fitting 20 and the outermost hollow and solid strands 38a and 38b, respectively. Thus, as shown in FIGS. 2 and 2A, those joints are specifically targeted for coverage by the corrosion-protective coatings of the present invention.

Normally, a preformed layer of brazing alloy 44 is placed between the ends of the strands (see 38 and 40 in FIG. 2A) and flows between the strands a prescribed distance from the ends of the strands. The alloy material 44 is sized to provide a brazed joint having a defined thickness while the length of the brazed joint is restricted by the allowable space inside the fitting 18' and has a complementary shape to opening 21. During heating, the braze alloy 44 is allowed to flow and fill spaces between individual rows of strands and between the strand package and the inner wall of fitting 18. When flowing, the braze alloy will travel along the sides of the strands, often reaching the ends of the strands as shown at 46 in FIG. 2A.

Figure 2A:
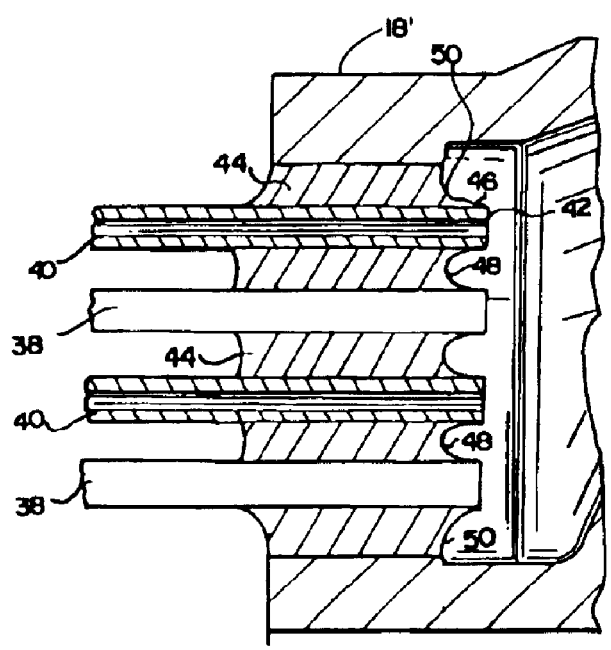
FIG. 2A is a partial section through a conventional brazed joint between stator bar strands and a hydraulic fitting.

As those skilled in the art will appreciate, this known brazing method creates natural concave pockets 48 between adjacent strands 38, 40, and between the upper and lower strands and the hydraulic end fitting 18' as shown at 50 in FIG. 2A. Such concave pockets can lead to water stagnation and result in the corrosion problem described above, which in turn can lead to stator bar failure.

In the preferred embodiment of the invention, a coating of, for example, Ti, is placed over the brazed fitting, particularly along end edges 42, as well as over the concave pockets 48 between adjacent strands 38, 40 and between the upper and lower strands and the hydraulic end fitting 18'. The presence of the protective coating over the brazed joints significantly improves the life expectancy of the treated water-cooled stator bar clips for both new and in-service generators. Preferably, the coating thickness ranges between 0.5 and 50 microns.

Figure 3:
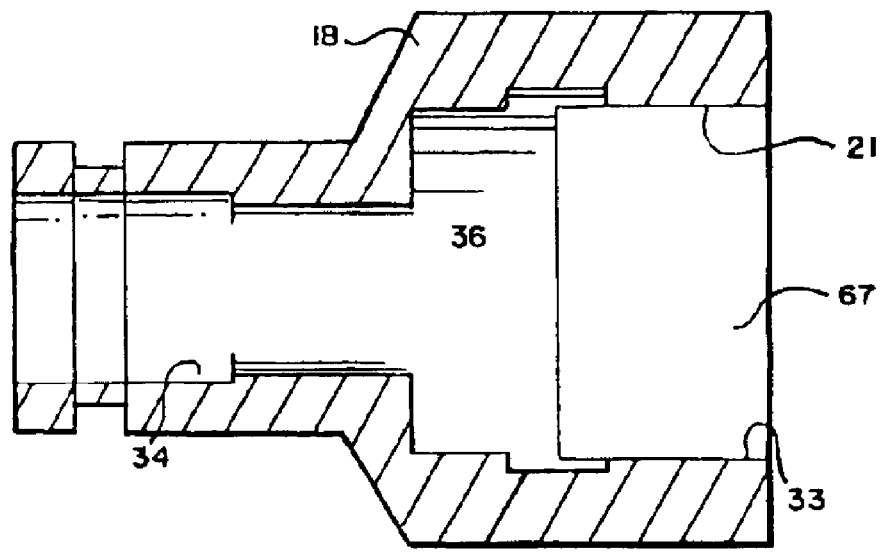
FIG. 3 is a further illustration of a liquid-cooled end fitting for a stator bar that allows for tight compression of the strand bundle into the fitting, again depicting the location of protective coatings as applied to the end fitting in accordance with the invention.

With reference to FIG. 3, each end fitting comprises a closed body having a rectilinear opening 33 at one end thereof for receiving the individual copper strands of the stator bar. At the opposite end, an opening 34 is provided which is normally closed by a copper tube that serves as both an electrical connection and a hydraulic conduit for the liquid coolant, e.g., deionized water, flowing into or from the chamber 36 defined by the walls of the end fitting and the exposed ends of the hollow and solid copper strands. The liquid in chamber 36 either flows into the fitting and through the hollow strands (see 30 on FIG. 2) for cooling purposes (when the fitting comprises an inlet fitting). Alternatively, liquid coolant flows out from the hollow strands 30 (when the fitting is used as an outlet fitting). Typically, a window 67 is inserted into cut out 21 to compress the strands and is then brazed in place within the fitting 18 to allow for tight compression of the strand bundle.

Figure 4:
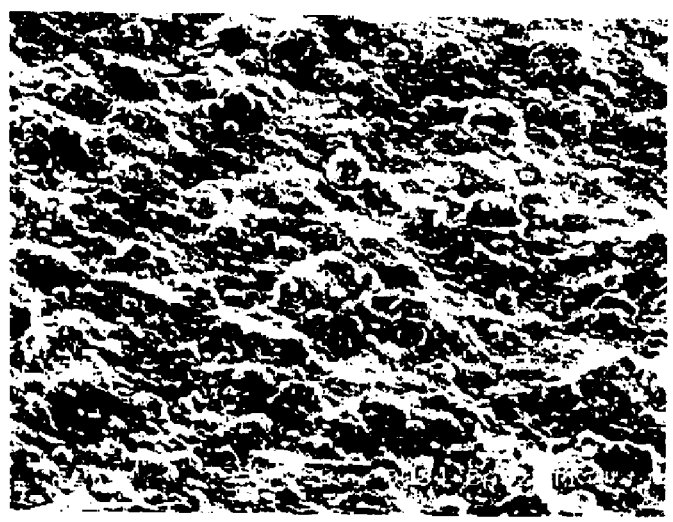
FIG. 4 is a photomicrograph showing the top surface morphology of an exemplary Ti protective coating in accordance with the invention as applied to a copper substrate (such as the copper used for stator-bar cooling strands), with the Ti being applied by PVD.

FIG. 4 of the drawings depicts an exemplary coating in accordance with the invention as applied to the copper substrate of stator-bar cooling strands, with the Ti being applied in this instance by a PVD process (ion plasma deposition). The photomicrograph of FIG. 4 shows the nominal top surface morphology of an exemplary Ti protective coating applied over the brazed joints, particularly the dormant (stagnant) areas of the stator bar structure that are most vulnerable to corrosion.

Figure 5:
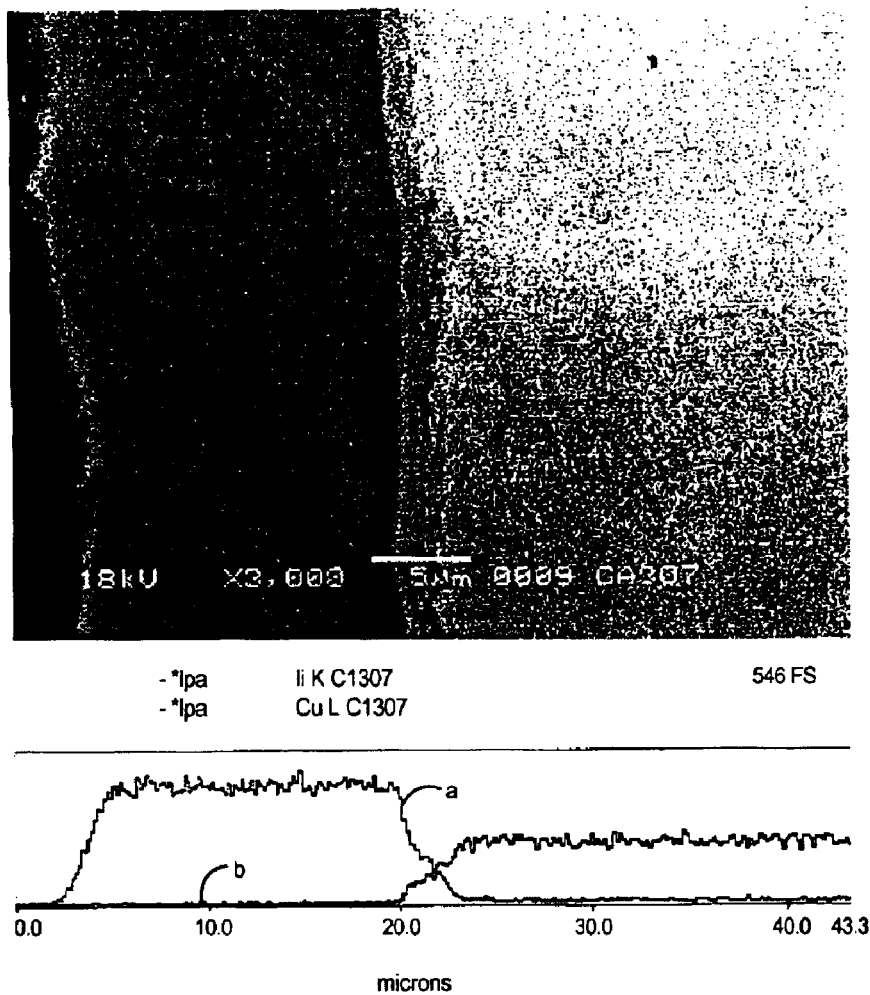
FIG. 5 shows a cross-sectional view of the same Ti layer referenced in FIG. 4 after being coated on the copper substrate by PVD.

FIG. 5 is a second photomicrograph, this time depicting the cross-section of the Ti layer coated onto the copper substrate, also using a PVD process. The graphical representation directly below the photomicrograph shows two line plots representing the relative thicknesses of the Ti coating as applied over the copper substrate (labeled "a"), along with the thickness of the copper itself (labeled "b"). Both lines are plotted against the thickness of the entire coated article in microns (ranging from zero on the surface to a maximum of about 43 microns). The level of magnification used for the photomicrograph and a representative line representing 5 microns appear in the lower portion of the photomicrograph. The titanium-rich coating according to the invention is shown on the right-hand side with the thickness level increasing up to a level of about 43 microns. In the embodiment depicted in FIG. 5, the thickness of the Ti comprises approximately one-half of the entire coating, i.e., about 20–21 microns. As noted above, when the stator bars are placed back in service, the exposure of the Ti coating to air, moisture, or water eventually forms a protective oxidized layer of $TiO_2$.

Figure 6:
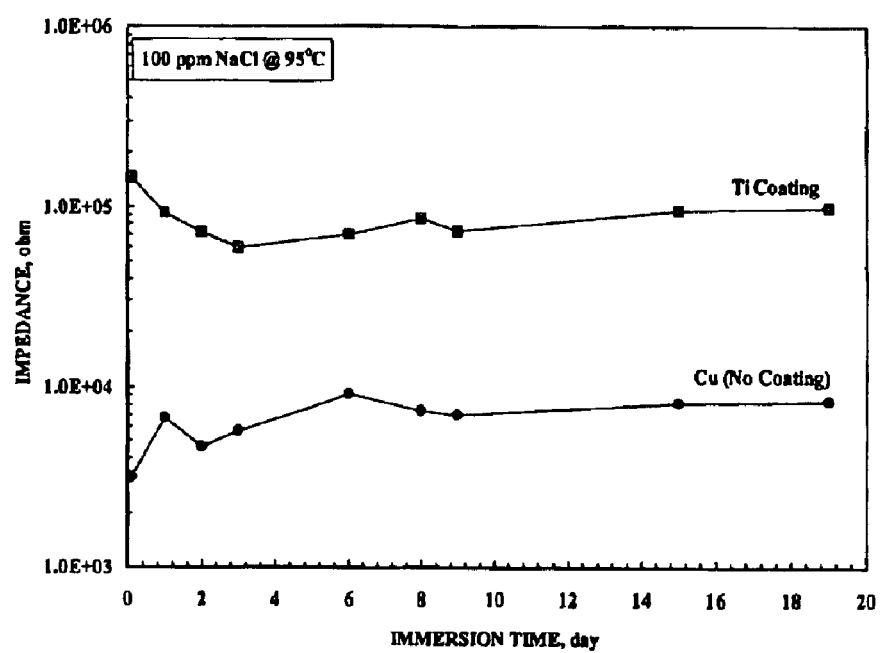
FIG. 6 is a graph showing the relative corrosion resistance of exemplary water-cooled stator bars having a coating of Ti in accordance with the invention plotted as a function of immersion time in an aqueous solution containing 100 ppm NaCl at 95° C.

FIG. 6 is a graphical representation of the results of corrosion tests performed on an exemplary protective coating in accordance with the invention, showing the relative corrosion resistance of a water-cooled stator bar having a coating of Ti plotted as a function of immersion time in 100 ppm NaCl solution at 95° C. The top line in FIG. 6 shows the impedance in ohms for the coated article plotted against the time of immersion in days. FIG. 6 indicates that the impedance level for the coated article remained essentially constant over the entire 19-day test period under severe corrosive conditions (100 ppm NaCl solution at 95° C.). No potential failure of the coating was evident after 19 days. The uncoated copper substrate in FIG. 6 shows a lower level of impedance over the same 19-day time period.

Figure 7:
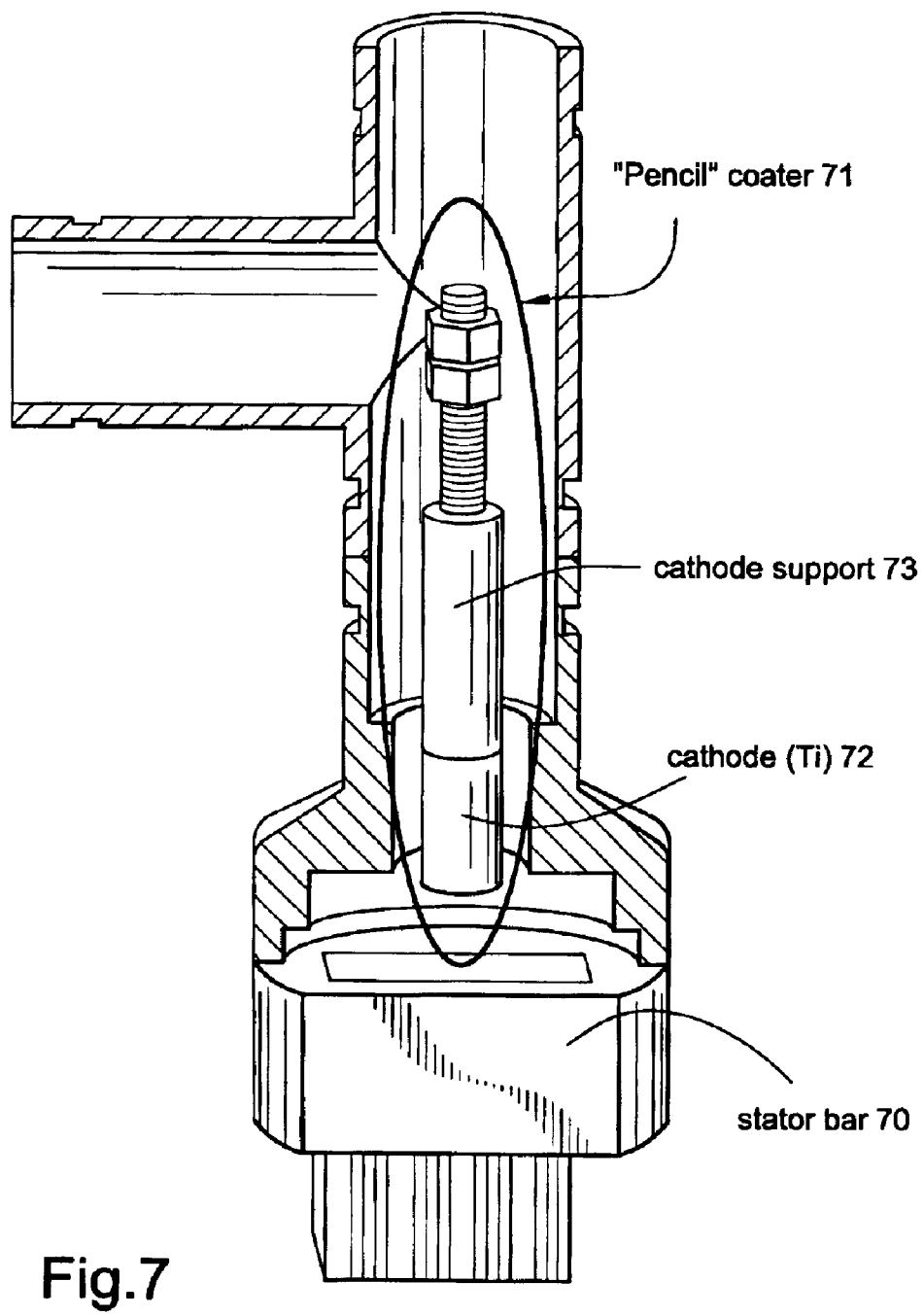
FIG. 7 is a three-dimensional illustration of a special pencil coater apparatus, shown with a partial cutaway section, for use in applying protective coatings according to the invention on water-cooled stator bars using ion plasma technology.

FIG. 7 is a three-dimensional illustration of an exemplary coating apparatus for use in applying protective coatings on water-cooled stator bars in accordance with the invention. This particular method employs a "pencil" coater (sometimes known in the art as a "micro coater") and has the advantage of being insertible into one end of the cooling pipe connected to the stator bar 70, thereby allowing the coating to be applied to selected brazed joints in a systematic and controlled manner. The pencil coater apparatus 71 shown in FIG. 7 uses an ion plasma deposition process to deposit a metal or metal oxide coating at small, prescribed locations, depending on the position of the cathode. The design and operation of one known pencil coater device useful in applying the coatings according to the invention (including titanium cathode 72 and cathode support 73) is described in an article by R. A. MacGill, M. R. Dickinson and I. G. Brown based on work done at the University of California at Berkeley, entitled *"Vacuum Arc Ion Sources— Micro to Macro"* (Rev. Sci. Instrum. 67 (3), March 1996. The pencil coater design and methodology described in the article are hereby incorporated by reference. As FIG. 7 illustrates, the pencil coater is inserted down into the neck of the clip to coat the desired internal areas.

Figure 8:
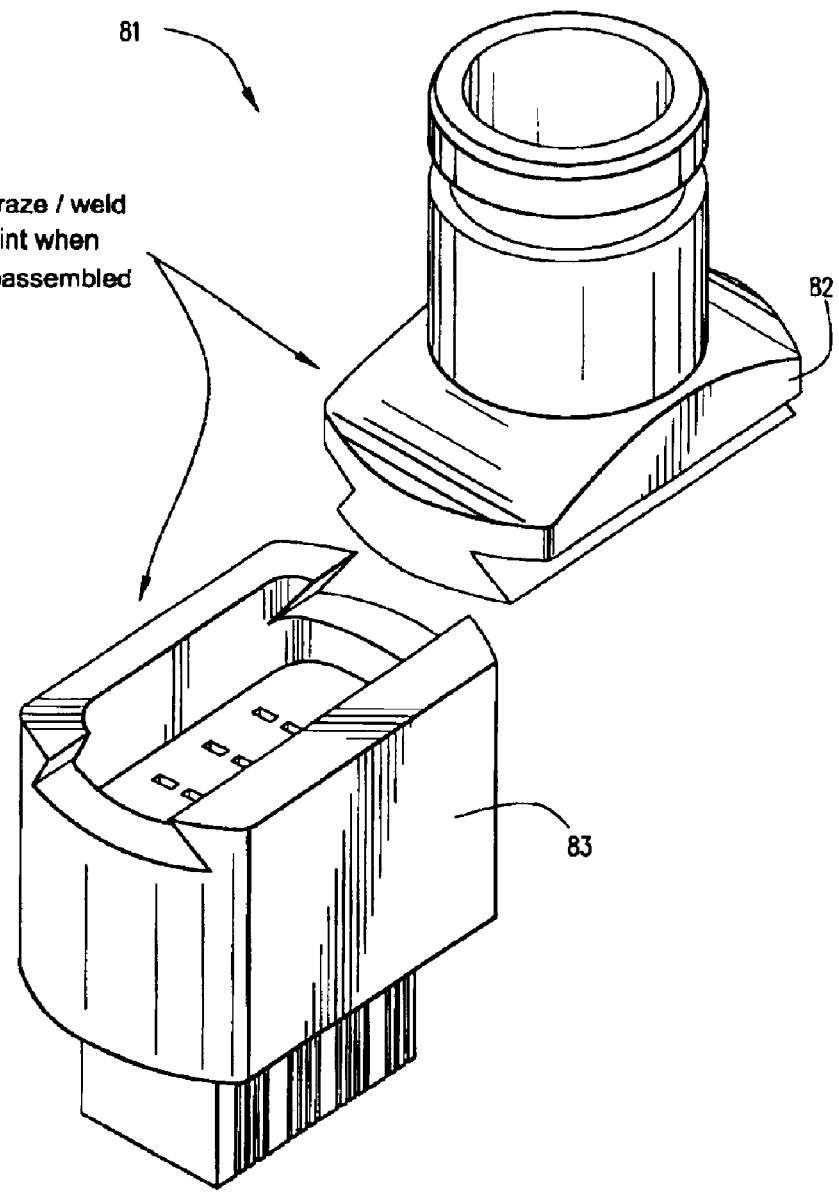
FIG. 8 is a three-dimensional view of a new stator bar clip design (known as a "split clip") that allows protective coatings in accordance with the invention to be applied directly to critical joints using known deposition techniques before the end clips are placed into service in a generator, i.e., when the split clip is in an "open" position.

FIG. 8 is a three-dimensional view of an alternative stator bar clip design (known as a "split clip") that allows the protective coatings according to the invention to be applied before the clips are placed into service. The split clip shown generally in FIG. 8 as 81 uses a "dovetail" design that permits the coating to be applied to the most vulnerable areas of the water-cooled stator bar clip before the two dovetail parts 82 and 83 are secured together.

For some repair installations, the top part of the clip can be dovetailed off from the rest of the clip in a like manner to expose the ends of the strands which are thereafter coated. For both new and repair installations selected vulnerable areas of the end fitting bar are coated in a first step using, for example, a physical vapor deposition technique such as ion plasma deposition. The coated fitting is then permanently joined to the water-cooling piping using a braze/weld with the dovetail connection reassembled as shown.

In one embodiment, the basic repair steps involved in coating the end fittings of a previously installed stator bar are as follows. First, the generator end fitting is cut with a dovetail at the neck of the clip. The removed portion exposes the tops of the strands for repair, thereby ensuring that a significant portion of the deposition coating will go directly into the ends of the strand and providing a more robust and uniform coating. Once the repair has been completed, the top dovetail portion is brazed back onto the stator bar clip. (See FIG. 8).

If the stator bar end fitting is coated using ion plasma deposition, the entire face of strands should be directly exposed to the cathode. The use of the dovetail cut opens up the face of the clip to the full cathode allowing for better overall coating to be applied to the entire exposed area. The end result is an improved coating consistency, uniformity and structural integrity over time. Alternatively, a pencil coater apparatus as described above can be used to coat the internals of the clip without the necessity of making a dovetail cut since the coater is designed to be inserted into the neck of the clip to coat the internal areas as shown in FIG. 7.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of repairing the end fittings of a water-cooled stator bar having a plurality of copper strands brazed with an original alloy into an end fitting surrounding one end of said strands, comprising the steps of:

disconnecting the inlet and outlet end fittings of said stator bar from its respective inlet and outlet cooling headers, and applying a protective coating consisting of Sc, Ti, Cr, Zr, Nb, Mo, Hf, Ta, W, Ni or Al, or their alloys and oxides to one or more brazed joints of said copper strands in said stator bar.

2. A method according to claim 1, wherein said step of applying a protective coating results in a coating thickness of between 0.5 and 50 microns.

3. A method according to claim 1, wherein said step of applying said protective coating includes the use of a pencil coater inserted into said inlet or outlet fitting of said stator bar to coat said brazed joints using an ion plasma deposition process.

4. A method according to claim 1, further comprising the step of exposing said protective coating applied to said brazed joints to water to oxidize said protective coating.

5. A method according to claim 1, further comprising the steps of removing the top portion of said stator bar to expose the ends of said copper strands disposed in the bottom portion of said stator bar, applying said protective coating to said exposed ends and reassembling said top and bottom portions.

6. A method of repairing the end fittings of a water-cooled stator bar having a plurality of copper strands brazed with an original alloy into an end fitting surrounding one end of said strands, comprising the steps of:

disconnecting the inlet and outlet end fittings of said stator bar from their respective inlet and outlet cooling headers, cutting an end portion of said inlet or outlet end fittings into two segments having a mated dovetail configuration along a line generally transverse to said copper strands and at a location intermediate said end fitting and said copper strands, applying a protective coating to the exposed brazed joints of said copper strands present in one segment of said stator bar; and permanently rejoining said segments of said stator bar along the mated dovetail after said protective coating is applied.

7. A method according to claim 6, wherein said step of applying a protective coating includes the use of Sc, Ti, Cr, Zr, Nb, Mo, Hf, Ta, W, Ni or Al, or their alloys and oxides.

8. A method according to claim 6, wherein said step of applying a protective coating results in a coating thickness of between 0.5 and 50 microns.

9. A method according to claim 6, further comprising the step of exposing said protective coating applied to said brazed joints to water to oxidize said protective coating.

10. A water-cooled stator bar comprising (a) a plurality of hollow and solid copper strands having brazed joints connecting said copper strands to one another and to inlet and outlet end fittings for said stator bar; and (b) a protective coating of Sc, Ti, Cr, Zr, Nb, Mo, Hf, Ta, W, Ni or Al, or their alloys and oxides applied to selected portions of said brazed joints of said copper strands and said end fittings.

11. A liquid-cooled stator core winding arrangement comprising, a stator core, stator core flanges, core ribs, a plurality of stator bars passing radially through extending slots in said stator core and terminating at opposite ends in inlet and outlet end fittings connecting to respective inlet and outlet liquid cooling headers, each said stator bar further comprising a plurality of hollow and solid copper strands, brazed joints connecting said copper strands to one another and to inlet and outlet end fittings for said stator bar, and a protective coating of Sc, Ti, Cr, Zr, Nb, Mo, Hf, Ta, W, Ni or Al, or their alloys and oxides applied to selected portions of said brazed joints of said copper strands and said end fittings.

12. A method of repairing the end fittings of a water-cooled stator bar having a plurality of copper strands brazed with an original alloy into an end fitting surrounding one end of said strands, comprising the steps of:

disconnecting the inlet and outlet end fittings of said stator bar from its respective inlet and outlet cooling headers, and applying a protective coating consisting of Sc, Ti, Cr, Zr, Nb, Mo, Hf, Ta, W, Ni or Al, or their alloys and oxides to one or more brazed joints of said copper strands in said stator bar using a pencil coater and ion plasma deposition process.

13. A method according to claim 12, wherein said step of applying a protective coating results in an coating thickness of between 0.5 and 50 microns.

14. A method according to claim 12, further comprising the step of exposing said protective coating applied to said brazed joints to water to oxidize said protective coating.

15. A method according to claim 12, further comprising the steps of removing the top portion of said stator bar to expose the ends of said copper strands disposed in the bottom portion of said stator bar, applying said protective coating to said exposed ends and reassembling said top and bottom portions.

16. A method of repairing the end fittings of a water-cooled stator bar resulting in a plurality of copper strands brazed with an original alloy into an end fitting surrounding one end of said strands, comprising the steps of:

disconnecting the inlet and outlet end fittings of said stator bar from their respective inlet and outlet cooling headers, dovetailing the end portions of said inlet and outlet end fittings by cutting an end portion thereof into two segments having a mated dovetail configuration along a line generally transverse to said copper strands and at a location intermediate said end fitting and said copper strands, applying a protective coating to the exposed brazed joints of said copper strands present in one segment of said stator bar; and permanently rejoining said segments of said stator bar having a mated dovetail configuration after said protective coating is applied.

17. A method according to claim 16, wherein said step of applying a protective coating uses Sc, Ti, Cr, Zr, Nb, Mo, Hf, Ta, W, Ni or Al, or their alloys and oxides.

18. A method according to claim 16, wherein said step of applying a protective coating results in a coating thickness of between 0.5 and 50 microns.

19. A method according to claim 16, further comprising the step of exposing said protective coating applied to said brazed joints to water to oxidize said protective coating.

20. A method according to claim 16, wherein said step of applying said protective coating includes the use of a pencil coater inserted into said inlet or outlet fitting of said stator bar to coat said brazed joints using an ion plasma deposition process.

* * * * *